(12) United States Patent
Katzir

(10) Patent No.: US 9,915,565 B2
(45) Date of Patent: Mar. 13, 2018

(54) METHOD AND SYSTEM FOR SPECTRAL IMAGING

(71) Applicant: Applied Spectral Imaging Ltd., Yokneam (IL)

(72) Inventor: Nir Katzir, Givat Elah (IL)

(73) Assignee: Applied Spectral Imaging Ltd., Yokneam (IL)

(*) Notice: Subject to any disclaimer, the term of this patent is extended or adjusted under 35 U.S.C. 154(b) by 0 days.

(21) Appl. No.: 14/438,641

(22) PCT Filed: Oct. 24, 2013

(86) PCT No.: PCT/IL2013/050868
§ 371 (c)(1),
(2) Date: Apr. 27, 2015

(87) PCT Pub. No.: WO2014/064701
PCT Pub. Date: May 1, 2014

(65) Prior Publication Data
US 2015/0285686 A1    Oct. 8, 2015

Related U.S. Application Data

(60) Provisional application No. 61/718,977, filed on Oct. 26, 2012.

(51) Int. Cl.
*G01J 3/45* (2006.01)
*G01J 3/453* (2006.01)
(Continued)

(52) U.S. Cl.
CPC ............ *G01J 3/4532* (2013.01); *G01J 3/0237* (2013.01); *G01J 3/0297* (2013.01); *G01J 3/2823* (2013.01); *G01J 3/45* (2013.01); *G02B 27/144* (2013.01)

(58) Field of Classification Search
CPC ........ G01J 3/00; G01J 3/02; G01J 3/45; G01J 3/4532
(Continued)

(56) References Cited

U.S. PATENT DOCUMENTS 4,684,255 A    8/1987    Ford
5,539,517 A    7/1996    Cabib et al.
(Continued)

FOREIGN PATENT DOCUMENTS

CA    2497775    7/1999
CN    102322956    1/2012
(Continued)

OTHER PUBLICATIONS

International Preliminary Report on Patentability dated May 7, 2015 From the International Bureau of WIPO Re. Application No. PCT/IL2013/050868.
(Continued)

*Primary Examiner* — Jonathan Hansen

(57) ABSTRACT

A method of calibrating a spectral imaging system is disclosed. The spectral imaging system comprises an interferometer having a beam splitter and at least a first reflector and a second reflector. The method comprises: obtaining data pertaining to an interference pattern model, operating the spectral imaging system to provide an interference pattern of a received light beam, and varying a relative orientation between at least two of: the beam splitter, the first reflector and the second reflector, until the interference pattern of the input light beam substantially matches the interference pattern model.

21 Claims, 6 Drawing Sheets

(51) Int. Cl.
*G02B 27/14* (2006.01)
*G01J 3/28* (2006.01)
*G01J 3/02* (2006.01)

(58) Field of Classification Search
USPC .......................................................... 356/455
See application file for complete search history.

(56) References Cited

U.S. PATENT DOCUMENTS

| | | | | |
|---|---|---|---|---|
| 5,933,792 | A | * | 8/1999 | Andersen ................. G01J 3/28 250/252.1 |
| 6,229,614 | B1 | * | 5/2001 | Larsen .................... G01J 3/453 356/451 |
| 6,421,131 | B1 | | 7/2002 | Miller |
| 6,449,048 | B1 | | 9/2002 | Olszak |
| 7,135,682 | B1 | | 11/2006 | Lucey |
| 2002/0163647 | A1 | | 11/2002 | Kato |
| 2008/0018901 | A1 | | 1/2008 | De Groot |
| 2010/0128276 | A1 | | 5/2010 | De Groot et al. |
| 2012/0116703 | A1 | | 5/2012 | Pavillon et al. |
| 2012/0120409 | A1 | | 5/2012 | Coffin |

FOREIGN PATENT DOCUMENTS

| | | |
|---|---|---|
| WO | WO 2011/086357 | 7/2011 |
| WO | WO 2014/064701 | 5/2014 |

OTHER PUBLICATIONS

International Search Report and the Written Opinion dated Mar. 17, 2014 From the International Searching Authority Re. Application No. PCT/IL2013/050868.
Garini et al. "Spectral Bio-Imaging", Fluorescence Imaging Spectroscopy & Microscopy, Chemical Analysis Series, 137(Chap.4): 87-123, 1996.
Garini et al. "Spectral Imaging: Principles and Applications", Cytometry Part A, 69A: 735-747, 2006.
Koudelka et al. "Fabrication of Cube Beamsplitters for White Light Interferometry", Optical Fabrication, Testing, and Metrology, Proceedings of the SPIE, 5252: 17-25, Jan. 1, 2004. p. 22, # 5, p. 23, # 5.2, Figs.1, 3, 6, 8.
Supplementary European Search Report and the European Search Opinion dated Mar. 1, 2017 From the European Patent Office Re. Application No. 13848356.5. (9 Pages).

* cited by examiner

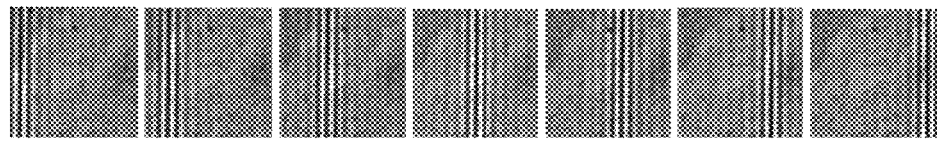
FIG. 5A
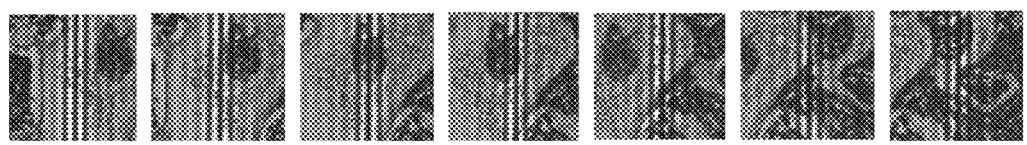
FIG. 5B
FIG. 6

METHOD AND SYSTEM FOR SPECTRAL IMAGING

RELATED APPLICATION

This application is a National Phase of PCT Patent Application No. PCT/IL2013/050868 having International filing date of Oct. 24, 2013, which claims the benefit of priority under 35 USC § 119(e) of U.S. Provisional Patent Application No. 61/718,977 filed Oct. 26, 2012. The contents of the above applications are all incorporated by reference as if fully set forth herein in their entirety.

FIELD AND BACKGROUND OF THE INVENTION

The present invention, in some embodiments thereof, relates to imaging and, more particularly, but not exclusively, to spectral imaging using an interferometer.

Images are often measured with a digital camera using either a charged coupled device (CCD) or the complementary metal-oxide semiconductor (CMOS) technologies. These detectors have a 2D array that is sensitive to light. The array is divided to small elements, pixels, and by using fore-optics, the image of the measured sample is focused on the 2D array according to a certain magnification factor. During the measurement, each pixel collects electric charge in a quantity that is proportional to the light that origin from a small part of the sample, and at the end of the measurement the charge is converted to a number. By presenting all these numbers on a monitor, the image can be observed, and the information can be stored and used for further processing.

The spatial resolution of an image can be controlled by the magnification of the fore-optics. Commercially available CCD or CMOS cameras vary in their number of pixels, size, sensitivity to light, speed of operation and other parameters. As an example, Andor (Belfast, UK) has an advanced high-end electron-multiplication CCD camera (EMCCD) that has a mechanism for improving the measured signal with respect to the so called analog-to-digital noise levels (for example, iXon). The actual sensitive array in this camera is cooled to a temperature of −1000 C so that the dark-noise created in the pixels themselves is reduced. The camera has a high quantum efficiency, and allows detecting more than 90% of the light in a large part of the spectrum. As another example, Balser (Ahrensburg, Germany) has a CCD camera with a more modest performance, but its price is much cheaper relative to the previously mentioned CCD.

The spatial resolution of an image captured by an imaging system having an imager and a magnifying element is known to depend on the number of pixels of the imager and the magnification of the magnifying element.

For example, a CCD with 1000×1000 pixels, each having dimensions of 10×10 $\mu m^2$, has overall dimensions of 1×1 $cm^2$. When such a CCD is used to image a sample with these same dimensions with a magnification fore-optics of 1, the entire sample can be imaged by the CCD, and the spatial resolution of the captured image is 10 micrometers. When such a CCD is used to image a sample with these same dimensions with a magnification fore-optics of, say, ×10, a resolution of 1 micrometer can be obtained. However, the improved resolution is traded with a reduced field-of-view since with a ×10 magnification, only 1×1 $mm^2$ of the sample is captured by this CCD. In order to increase the field-of-view, a scanning technique is typically employed, wherein the sample or/and the imaging system are moved one with respect to the other. In the above numerical example, at least 100 images are required to image a 1×1 $cm^2$ sample. Scanning systems known in the art include a microscope-based system marketed by Applied Spectral Imaging under the trade name GenASis Scan & Analysis™. This system has a scanning mechanism for measuring different samples on a microscope slide for optical microscopes.

It is recognized that the planar spatial resolution d of an optical microscope for a given wavelength λ, is bounded by the Abbe diffraction limit and is approximated as given by $d=0.61\lambda/N_A$, where $N_A$ is the numerical aperture of the objective lens.

Light is a radiating electric field that can be characterized by its spectrum. The spectrum describes the intensity I at each wavelength and can be expressed as a function I(λ). In a gray-level image, the intensity at each pixel of the imager is the integrated intensity of the spectrum that impinges on the pixel, which can be approximated as:

$$I=\int I(\lambda)d\lambda \quad (1)$$

where the integral is performed in the whole spectral range that the optical system can measure. EQ. 1 is an approximation, because the spectral response of the optical system is typically non-uniform across the spectral range. The resulting gray-scale image includes a set of values (e.g., intensity levels), one value for each pixel of the imager.

In color CCD or CMOS cameras, the two-dimensional imager is divided to sub-arrays of 4-pixels arranged in a 2×2 square. Each of the 4 pixels is coated with a filter that transmits only part of the spectral range. Typically, one of the pixels transmits the blue spectral range, the second one only red and the other two only green. Commercially available color cameras contain up to about 1000×1000 sub-arrays of 4 pixels.

In many cases, RGB color information is not sufficient, and a higher spectral resolution is desired. Known in the art is a technique termed "spectral imaging." In this technique, a spectrum is measured for each pixel of the imager. The resulting dataset is to three-dimensional (3D) in which two dimensions are parallel to the imager plane and the third dimension is the wavelength. Such dataset is known as a "spectral image" which can be written as I(x,y,λ), where x and y are the position in the imager plane, λ the wavelength, and I is the intensity at each point and wavelength.

Several spectral imaging techniques are known [Y. Garini, N. Katzir, D. Cabib, R. A. Buckwald, D. G. Soenksen, and Z. Malik, Spectral Bio-Imaging, in Fluorescence Imaging Spectroscopy and Microscopy, X. F. Wang and B. Herman, Editors. 1996, John Wiley and Sons: New York. p. 87-124; Y. Garini, I. T. Young, and G. McNamara, Spectral imaging: principles and applications. Cytometry, 69A, 735-747 (2006)]. In some systems, a set of filters is mounted on a filter wheel with a mechanism that allows capturing a set of images, each time thorough a different filter. In other systems, a spectral image is formed by means of a Fourier transform, as disclosed, for example, in U.S. Pat. No. 5,539,517, the contents of which are hereby incorporated by reference.

SUMMARY OF THE INVENTION

According to an aspect of some embodiments of the present invention there is provided a method of calibrating a spectral imaging system. The spectral imaging system comprises an interferometer having a beam splitter and at least a pair of reflectors, e.g., a first reflector and a second reflector. The method comprises: obtaining data pertaining to an interference pattern model, operating the spectral imaging system to provide an interference pattern of a received light beam, and varying a relative orientation between at least two of the beam splitter, the first reflector and the second reflector. The variation effects a change in the interference pattern of the light beam, and is optionally and preferably continued (continuously or intermittently) until the interference pattern of the input light beam substantially matches the interference pattern model.

According to some embodiments of the invention the interference pattern is a linear pattern and the interference pattern model data comprises a parameter that describes a density of interference lines in the linear pattern.

According to some embodiments of the invention the method comprises filtering the input light beam to provide a generally monochromatic light beam.

According to some embodiments of the invention the method calculates the interference pattern model data.

According to some embodiments of the invention the method comprises receiving an input spectra resolution parameter and calculating the interference pattern model data responsively to the input spectra resolution parameter.

According to some embodiments of the invention the calculation comprises receiving an input spatial resolution parameter and calculating the interference pattern model data responsively to the input spatial resolution parameter.

According to some embodiments of the invention the calculation comprises receiving an input acquisition time parameter and calculating the interference pattern model data responsively to the input acquisition time parameter.

According to some embodiments of the invention the calculation comprises receiving a spatial location at which an optical path difference between secondary light beams split by the beam splitter is zero, and calculating the interference pattern model data responsively to the location.

According to some embodiments of the invention the location is an off-center relative to a field-of-view characterizing the light beam.

According to some embodiments of the invention the variation of the relative orientation is executed automatically by a controller associated with a data processor.

According to some embodiments of the invention the method comprises scanning the light beam.

According to some embodiments of the invention the scanning is effected by a relative rotary motion between the input light beam and the beam splitter while a relative orientation the beam splitter and the reflectors is fixed.

According to some embodiments of the invention the scanning is effected by a relative translational motion between the input light beam and the beam splitter while a relative orientation the beam splitter and the reflectors is fixed.

According to some embodiments of the invention the method comprises fixing the relative orientation once the interference pattern of the input light beam substantially matches the interference pattern model, and operating the spectral imaging system at the fixed relative orientation to provide a spectral image of a scene.

According to an aspect of some embodiments of the present invention there is provided a spectral imaging system. The system comprises an interferometer having a beam splitter and at least a pair of reflectors, as further detailed hereinabove. The beam splitter is configured to split an input light beam into secondary light beams directed to the reflectors. In some embodiments of the present invention the system comprises an orientation adjustor configured to vary a relative orientation between at least two of the beam splitter and the reflectors. The adjustor is optionally and preferably configured to perform the variation during acquisition of spectral images by the spectral imaging system. In various exemplary embodiments of the invention adjustor is configured to perform the variation without disassembling the spectral imaging system and/or without disconnecting the spectral imaging system from the power source and/or without powering off the spectral imaging system.

According to some embodiments of the invention the orientation adjustor is a manually operated orientation adjustor.

According to some embodiments of the invention the system comprises a controller configured for automatically operating the orientation adjustor.

According to some embodiments of the invention the system comprises a data processor configured to receive data pertaining to an interference pattern model, and to signal the controller to operate the orientation adjustor responsively to the data.

According to some embodiments of the invention the data processor is configured to calculate the data.

According to some embodiments of the invention the data processor is configured to receive an input spectra resolution parameter and to calculate the data responsively to the input spectra resolution parameter.

According to some embodiments of the invention the data processor is configured to receive an input spatial resolution parameter and to calculate the data responsively to the input spatial resolution parameter.

According to some embodiments of the invention the data processor is configured to receive an input acquisition time parameter and to calculate the data responsively to the input acquisition time parameter.

According to some embodiments of the invention the data processor is configured to receive a spatial location at which an optical path difference between secondary light beams split by the beam splitter is zero, and to calculate the data responsively to the location.

According to an aspect of some embodiments of the present invention there is provided a method of capturing a spectral image of a scene. The method comprises: projecting an input light beam received from a plurality of points over the scene onto a spectral imaging system which comprises an interferometer having a beam splitter and a pair of reflectors, the beam splitter and the pair of reflectors being oriented such that the input light beam is split by the beam splitter into secondary light beams propagating asymmetrically with respect the beam splitter; and operating the spectral imaging system to provide a spectral image of the scene.

According to some embodiments of the invention the method comprises varying a relative orientation between at least two of the beam splitter and the reflectors prior to the projection.

According to some embodiments of the invention the method comprises magnifying the spectral image relative to the scene.

According to some embodiments of the invention the scene is a microscope slide. According to some embodiments of the invention the scene comprises a biological sample. According to some embodiments of the invention the scene comprises an outdoor terrestrial view.

According to some embodiments of the invention the method is executed from a moving vehicle.

According to some embodiments of the invention the input light beam is reflected from the scene or scattered off objects in the scene.

According to some embodiments of the invention the input light beam is transmitted through the scene.

According to some embodiments of the invention the input light beam is emitted by objects in the scene.

According to an aspect of some embodiments of the present invention there is provided a spectral imaging system. The system comprises an interferometer having a beam splitter and a pair of reflectors, the beam splitter and the pair of reflectors being oriented such that the input light beam is split by the beam splitter into secondary light beams propagating asymmetrically with respect the beam splitter.

According to some embodiments of the invention the system comprises a scanning stage configured for establishing a relative motion between the interferometer and a scene.

According to some embodiments of the invention the relative motion comprises a relative rotary motion. According to some embodiments of the invention the relative motion comprises a relative translational motion.

According to some embodiments of the invention system comprises a magnifying objective lens system positioned to receive the input light beam prior to the beam splitter.

According to some embodiments of the invention the system is mounted on a moving vehicle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-B show images within a sequence of an OPD-scan (FIG. 5A) and a sample-scan (FIG. 5B), according to some embodiments of the present invention;

FIG. 6 is an image demonstrating high spectral resolution, obtained according to some embodiments of the present invention;

DESCRIPTION OF SPECIFIC EMBODIMENTS OF THE INVENTION

Figure 1A:
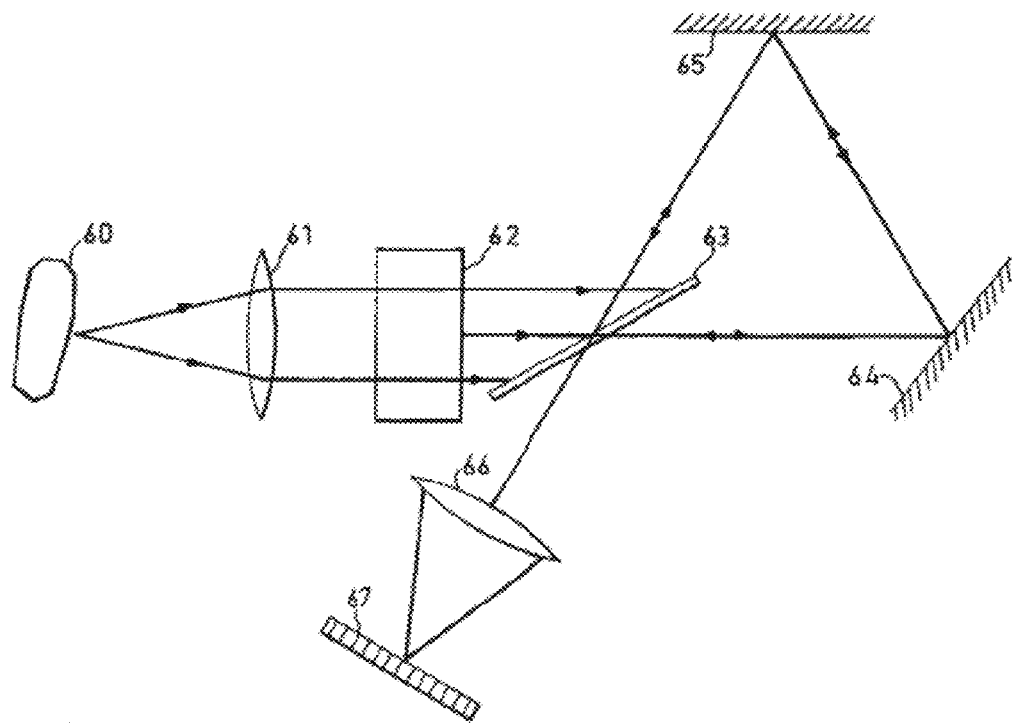
FIG. 1A is a schematic illustration of an interferometer.

The present invention, in some embodiments thereof, relates to imaging and, more particularly, but not exclusively, to spectral imaging using an interferometer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
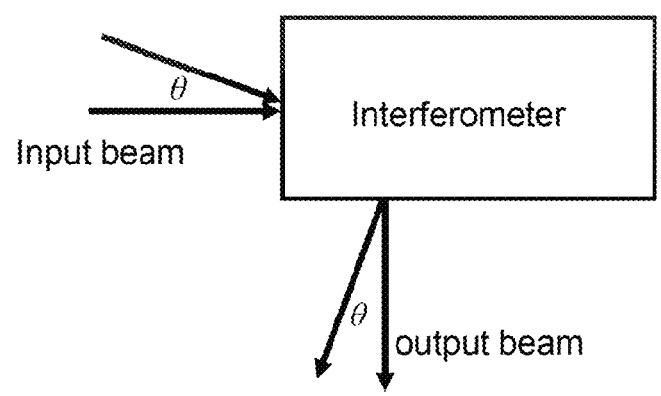
FIG. 1B is a schematic illustration showing the dependence of an optical path difference (OPD) on an entering angle of a light beam.

For purposes of better understanding some embodiments of the present invention, as illustrated in FIGS. 2, 3, 4A-B, 5A-B, 6, 7, 8 and 9 of the drawings, reference is first made to the construction and operation of a spectral imaging system as illustrated in FIGS. 1A and 1B.

FIG. 1A illustrates a non-moving type interferometer, which is a modified Sagnac interferometer, as used in an imaging spectrometer disclosed in U.S. Pat. No. 5,539,517, the contents of which are hereby incorporated by reference. In this interferometer, the optical path difference (OPD) varies with the angle of incidence of the incoming radiation. Typically, the OPD increases with the angle of incidence, and the relation between the OPD and the angle of incidence can be approximated as a linear relation. The radiation from source 60 after being collimated by an optical collection system 61, is scanned by a mechanical scanner 62. The light is then passed through a beam splitter 63 to a first reflector 64 and then to a second reflector 65, which reflects the light back through beam splitter 63 and then through a focusing lens 66 to an array 67 of detectors. This beam interferes with the beam which is reflected by beam splitter 63, reflector 65 and reflector 64.

Each point from the sample is focused on the same pixel of array 67. At the end of one scan, every pixel has been measured through all the OPDs by different detectors at different times, and therefore the spectrum can be reconstructed by a Fourier transform. A beam parallel to the optical axis is compensated, and a beam at an angle to the optical axis undergoes an OPD which, as taught by the '517 patent, is a function of the thickness of the beam splitter 63, its index of refraction, and the angle to the optical axis.

The advantage of this type of interferometer is that no filters, grating or prism are required, and the spectrum of the scene can be measured by using the effect of interference of light. The output obtained from intensities measured at many different OPDs, is known as an interferogram function. A Fourier transform can then be used to obtain spectral information from the scene.

As a result of the generated OPD, the intensity that is measured by array 67 depends on the spectrum of the entering light and the OPD. The generated OPD, in turn, depends on the entering angle of the beam. This is illustrated in FIG. 1B. As shown, any light ray (e.g., the central light ray of the beam) that is rotated by an angle θ at the entrance of the interferometer is rotated at the output by the same angle θ. However, while the rotation angle is preserved, the OPD between the two split beams within the interferometer is changed. The rate at which the OPD varies with the angle θ can be written as dOPD/dθ.

The '517 patent and other publications (see, e.g., Barducci et al., "Theoretical aspects of Fourier transform spectrometry and common path triangular interferometers," 2010, Optics Express, 18, 11622-11649) teach that the rate at which OPD varies with the angle θ depends only on the beam-splitter thickness, its index of refraction and the distance to the reflectors.

The present inventors found that that dOPD/dθ can also be controlled by varying the relative orientation between the beam splitter and one or more of the reflectors, such as, but not limited to, one or more of the reflectors that are directly fed by the beam splitter. Such relative orientation affects the symmetry of the split beams with respect to the beam splitter.

The discovery of the present inventors can be utilized for selecting dOPD/dθ and therefore also the range of OPD values obtainable by a spectral imaging system. It is to recognized that the spectral resolution Δλ obtainable using an interferometer-based spectral imaging system depends on the range of OPD values that can be achieved during the measurement of the interferogram. This can be formulated as:

$$\Delta\lambda = \frac{\lambda^2}{OPD_{max}}. \quad (EQ. 2)$$

where $OPD_{max}$ is the maximal OPD in the range. It is also recognized that according to the Nyquist sampling theorem, the change in OPD between each two sample points. In accordance with Nyquist criterion, ΔOPD is smaller than half of the minimal wavelength (maximal frequency) in the measured spectrum.

$$\Delta OPD \leq \frac{\lambda_{min}}{2}. \quad (EQ. 3)$$

Since the technique of the present embodiments allows controlling the obtainable range of OPD values, and in particular $OPD_{max}$, the present embodiments can be utilized to set the spectral resolution while maintaining a relatively small number of acquisitions.

Thus, according to some embodiments of the present invention a spectral imaging system having an interferometer can be calibrated by varying the relative orientation among the beam splitter and the reflectors. In operation, the spectral imaging system is optionally and preferably operated to provide an interference pattern of a received light beam, and the relative orientation among the beam splitter and the reflectors is varied until the interference pattern of the input light beam substantially matches an interference pattern model. The interference pattern model can be received from an external source (e.g., a user input, a computer readable medium, etc.) or it can be calculated by the method, for example, be means of a data processor, in response to one or more input parameters, as further detailed hereinbelow.

As used herein, "substantial matching" refers to matching of at least 80% or at least 90% or at least 95% or at least 96% or at least 97% or at least 98% or at least 99%.

The level of matching between two interference patterns (for example, between an interference pattern model and an interference pattern observed on the detector array imager of the spectral imaging system) can be determined, for example, by comparing the location of interference structures (e.g., interference lines, in case of linear interference patterns), and calculating the percentage of lines of the two patterns that are at the same location within a predetermined distance tolerant. When the interference pattern is periodic (for example, a periodic linear interference pattern) the level of matching between two interference patterns can be determined based on the difference between the period exhibited by one pattern and the period exhibited by the other pattern, if such difference exists. For example, a mismatch percentage can be calculated based on the difference between the periods (e.g., the percentage of the difference relative to one of the periods or relative to the average between the periods), and the level of matching can be set to a percentage that completes the mismatch percentage to 100%.

According to some embodiments of the invention, the input light beam is filtered to provide a generally monochromatic light beam. In these embodiments, the secondary light beans are also generally monochromatic and the interference pattern model corresponds to the central wavelength of the monochromatic light beam.

As used herein, generally monochromatic light beam" refers to a light beam having a spectrum characterized by a width of less than 100 nm or less than 50 nm or less than 40 nm or less than 30 nm or less than 20 nm.

Once a substantial matching is achieved, the relative orientation is preferably fixed, to complete the calibration process. The calibrated system can then be used to obtain a spectral imaging of a scene, as further detailed hereinbelow.

Before providing a further detailed description of the system and method according to some embodiments of the present invention, attention will be given to the advantages and potential applications offered thereby.

Consider, for example, the following scenario. Suppose that a 2×1 cm² biological sample is to be imaged by a filter-based spectral imaging system having detector area of 1×1 cm². Suppose also that a magnification of ×20 is employed, so that the field-of-view (FOV) of a single image capture constitutes 1/800 of the sample's area. Suppose further that a spectral resolution Δλ of 40 nm is desired and that the spectral range is 400-800 nm. For obtaining this spectral resolution, 10 spectral bands should be measured. Thus, in order to image the entire sample over the entire spectral range, while maintaining the desired spectral and spatial resolution, at least 10×800=8,000 images are to be captured (40 spectral bands for each of the 800 partial field-of-views). Now, suppose that instead of a 40 nm spectral resolution, a 10 nm spectral resolution is desired. In this case there are 40 spectral bands in the spectrum instead of 10 and the number of acquisitions becomes 32,000.

It was found by the present inventors that the practical spectral imaging may even be more complex.

Firstly, the above process requires two opto-mechanical scanning systems, wherein one system has a spatial x-y scanner to scan the different FOVs and also includes a focusing element to refocus on the sample in cases the respective FOV is at a different focal plane. The other system is utilized for replacing the filter according to the spectral band that is being acquired. These two systems make the spectral imaging technologically difficult to employ or not practical.

Secondly, the spatial x-y scanning typically requires some relaxation time before the system becomes mechanically static after the vibrations stops. This relaxation time is multiplied by the number of acquisitions (32,000, in the above example) and therefore significantly increases the total acquisition time.

Since the technique of the present embodiments allows increasing the maximal OPD of the system, the value of $\Delta\lambda$ can be reduced (see EQ. 2) to the desired level without increasing the number of acquisitions.

An additional advantageous of the present embodiments is the ability to adapt the spectral imaging system to a specific application. For example, when a high spectral resolution is required, the asymmetry of the beam splitter can be selected to effect high value of $OPD_{max}$, and when short acquisition times are desired, the asymmetry of the beam splitter can be selected to effect a lower value of $OPD_{max}$.

The present inventors found that the level of asymmetry of the beam splitter can be used to control a tradeoff between the spectral resolution and the total acquisition time. The present inventors demonstrated that the effect of the level of asymmetry on the total acquisition time is significant even to the extent of practicing applications that have been heretofore impractical due to their slow measurement speed. Generally, an interferometer-based spectral imaging system has the advantage that the acquisition time can be shortened by scarifying spectral resolution. This can be achieved exploiting only a fraction of the obtainable OPD range (or, equivalently, by collecting data from fewer points over the sample). The technique of the present embodiments allows to further shorten the acquisition time by controlling dOPD/dθ.

A further advantageous of the present embodiments is the relatively small number of acquisitions that are required for a given spectral resolution goal. Aside from reducing the total acquisition time, the relatively small number of acquisitions also saves on computer storage resources. This is particularly useful for applications that acquire large amount of data at relative short time.

The system and method according to some embodiments of the present invention can be used in many applications.

In some embodiments of the present invention the system and method are used to obtain a spectral image of a microscope slide. The imaged object can be, for example, a biological sample, such as, but not limited to, a tissue section, a cytology specimen, a histological slide, an immunohistochemical slide, an in-situ hybridization (ISH) slide (e.g., a FISH slide, an M-ISH slide, etc.), a blood sample and any combination thereof.

The biological sample can optionally be stained.

As used herein in the specification and in the claims section below, the term "stained" or "staining" refers to a process in which coloration is produced by foreign matter, having penetrated into and/or interacted with the biological sample. Such foreign matter is referred to hereinafter as a stain.

The stain can be of any type which is suitable to produce coloring in the biological sample. The stain can be either a global stain or a target-specific stain. Representative examples of stains include, without limitation, immunohistochemical stain, a histological stain, a DNA ploidy stain, nucleic acid (DNA or RNA) sequence specific probes (from single locus, gene or EST sequence to whole chromosome or chromosomes paints) or any combination thereof. The histological stain can be, for example, Hematoxylin-Eosin stain, Giemsa stains of different types (Romanowsky-Giemsa, May-Grunwald-Giemsa, etc.), Masson's trichrome, Papanicolaou stain and the like.

As used herein in the specification and in the claims section below, the term "stain" or "stains" refers to colorants, either fluorescent, luminescent and/or non-fluorescent (chromogenes) and further to reagents or matter used for effecting coloration.

As used herein in the specification and in the claims section below, the term "immunohistochemical stain" refers to colorants, reactions and associated reagents in which a primary antibody which binds a cytological marker is used to directly or indirectly (via "sandwich" reagents and/or an enzymatic reaction) stain the biological sample examined Immunohistochemical stains are in many cases referred to in the scientific literature as immunostains, immunocytostains, immunohistopathological stains, etc.

As used herein in the specification and in the claims section below, the term "histological stain" refers to any colorant, reaction and/or associated reagents used to stain cells and tissues in association with cell components such as types of proteins (acidic, basic), DNA, RNA, lipids, cytoplasm components, nuclear components, membrane components, etc. Histological stains are in many cases referred to as counterstains, cytological stains, histopathological stains, etc.

As used herein in the specification and in the claims section below, the term "DNA ploidy stain" refers to stains which stoichiometrically bind to chromosome components, such as, but not limited to, DNA or histones. When an antibody is involved, such as anti-histone antibody, such stains are also known as DNA immunoploidy stains.

As used herein in the specification and in the claims section below, the phrase "nucleic acid sequence specific probe" refers to polynucleotides labeled with a label moiety which is either directly or indirectly detectable, which polynucleotides being capable of base-pairing with matching nucleic acid sequences present in the biological sample.

Lists of known stains are provided in U.S. Pat. No. 6,007,996, filed Jul. 27, 1998, the contents of which are hereby incorporated by reference.

Representative examples of biological element that response differently to a staining procedure and which are identifiable by their structure according to some embodiments of the present invention, include nuclear matter, cytoplasm matter, erythrocytes, leukocytes, tissue elements (e.g., glands, ducts, lobules, stroma, adipose tissue, blood vessels, hair, fibroblasts, macrophage, neutrophils, necrotic areas, granulomas) and the like.

In some embodiments of the present invention the system and method are used to obtain a spectral image of an outdoor terrestrial view. This can be done from a vehicle, e.g., a moving vehicle such as, but not limited to, an aerial vehicle (e.g., an aircraft, a jet airplane, a helicopter, an unmanned aerial vehicle, a passenger aircraft, a cargo aircraft), a ground vehicle (e.g., an automobile, a motorcycle, a truck, a tank, a train, a bus, an unmanned ground vehicle), an aqueous or subaqueous vehicle (e.g., a boat, a raft, a battleship, a submarine), an amphibious vehicle and a semi-amphibious vehicle.

For example, the system and method of the present embodiments can be used to capture an image of the earth from above. Thus, a system according to some embodiments of the present invention can be an airborne spectral imaging system. Imaging the earth from above is useful, for example, for controlling the state of some cultivation, e.g., the state of large plots of wheat or corn cultivated land. The spectral images captured by the system and method of the present embodiments can be used for periodically checking the rate of growth of cultivation, in order to take preventive or curative steps in case possible problems arise (e.g., effects of long periods of drought, parasite attacks, etc).

Figure 2:
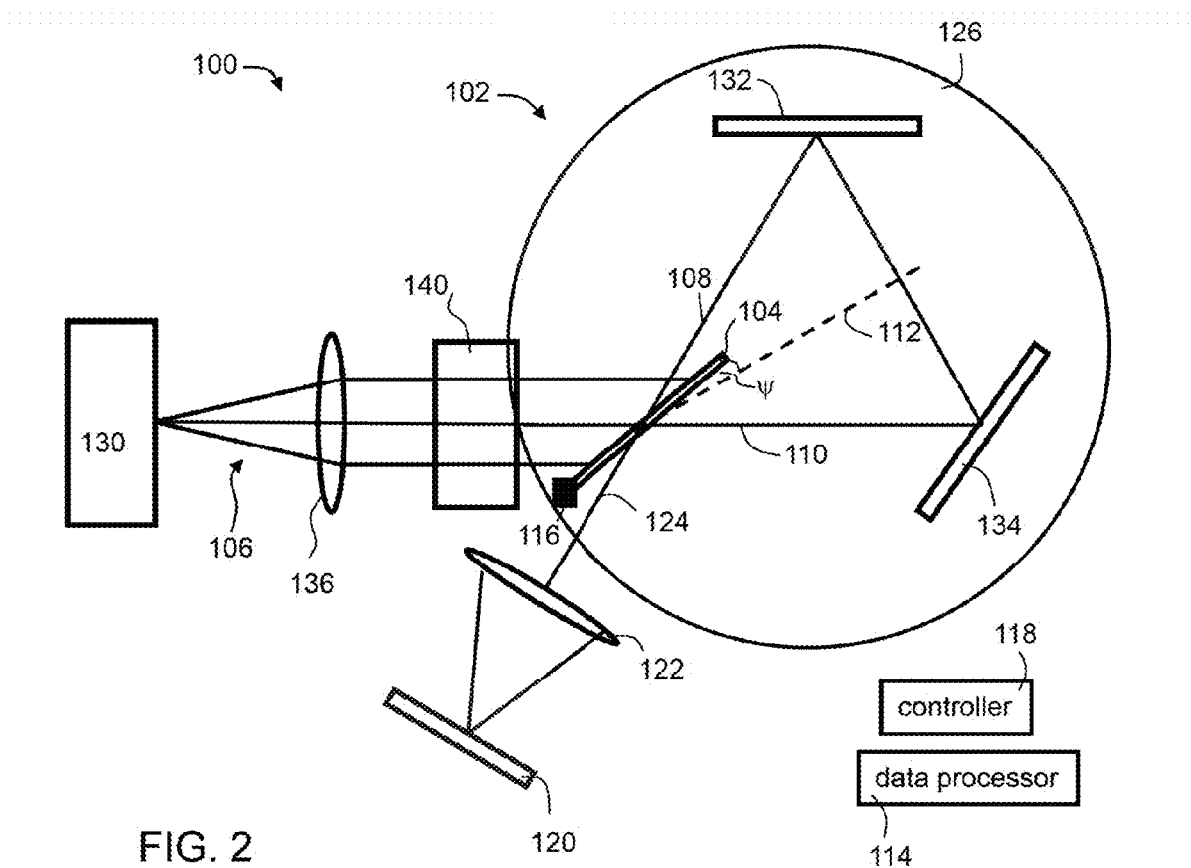
FIG. 2 is a schematic illustration of a spectral imaging system, according to some embodiments of the present invention.

Reference is now made to FIG. 2 which is a schematic illustration of a spectral imaging system 100 for capturing a spectral image of a scene 130, according to some embodiments of the present invention. System 100 comprises an interferometer 102 having a beam splitter 104 configured to split an input light 106 beam into secondary light beams so as to generate an optical path difference (OPD) between two light rays respectively 108 and 110.

The illustration in FIG. 2 is of a type of interferometer known as the Sagnac type. While the embodiments below are described with a particular emphasis to Sagnac interferometer, it is to be understood that more detailed reference to such interferometer is not to be interpreted as limiting the scope of the invention in any way. Thus, embodiments of the present invention can be applied also to many other types of interferometers, such as, but not limited to, a Michelson interferometer, a Mach-Zehnder interferometer, and a Polarimetric interferometer.

Input light beam 106 optionally and preferably passes through a lens system 136 which preferably collimates beam 106. Optionally, lens system 136 also serves as a magnifying objective lens system. The objective lens system can be of any type, including, without limitation, dry, oil-immersion, water-immersion, water-dipped and the like. The objective lens system can provide any magnification from ×1 to ×100. Input light beam 106 can be reflected from the scene, scattered off objects in the scene, transmitted through the scene or emitted by objects in the scene.

Light rays 108 and 110 are constituted by the secondary light beams. For example, each of light rays can be a central light ray of the respective secondary light beam. For clarity of presentation, the secondary light beams themselves are not shown, but the skilled person would know how to adjust the drawing to show the light beam that constitutes each of rays 108 and 110 (for example, by drawing light rays that are parallel to rays 108 and 110).

At least a portion of each of the secondary beams, particularly the portions that includes rays 108 and 110, is redirected by a reflector. Thus, in various exemplary embodiments of the invention system 10 comprises two or more reflectors. In the illustration of FIG. 2, system 10 comprises a pair of reflectors 132 and 134. In this illustration, which is not to be considered as limiting, ray 108 is reflected off reflector 132 and ray 110 is reflected off reflector 134. Following the reflections, ray 108 continues to reflector 134, and ray 108 continues to reflector 132. From the reflectors 132 and 134 the light rays 108 and 110 are reflected back to pass the beam splitter 104 again. At this stage, they have experienced OPD. A superposition of the secondary beams, after they have experienced OPD, is represented by line 124. Note that some of the light is reflected or transmitted back to the light source.

In various exemplary embodiments of the invention rays 108 and 110 propagate asymmetrically with respect to beam splitter 104. Shown in FIG. 2 is angle bisector 112 that divides the angle between rays 108 and 110 into two equal parts. The asymmetry of rays 108 and 110 with respect to beam splitter 104 is illustrated in FIG. 2 as a misalignment between beam splitter 104 and angle bisector 112. In an embodiment of the invention, such as, but not limited to, the embodiment illustrated in FIG. 2, the asymmetry is realized by a configuration in which the angle between the plane engaged by beam splitter 104 and the plane engaged by reflector 132, differs from the angle between the plane engaged by beam splitter 104 and the plane engaged by reflector 134. Thus, beam splitter 104 is oriented asymmetrically with respect to reflectors 132 and 134 and is configured to split input light beam 106 into the secondary light beams such that they are directed to feed reflectors 132 and 134. The asymmetry can also be realized by positioning an additional optical element on the optical path between beam splitter 104 and one of the reflectors.

System 100 can additionally comprise a detector array 120 which detects the secondary beams after they have experienced OPD, optionally and preferably via a focusing element 122. Detector array 120 can be of any types known in the art. A representative example includes, without limitation, a pixilated array, e.g., a CCD or a CMOS imager. Detector array can have any frame-rate. Typical frame rates include, without limitation, 1-1000 frames per second. System 100 optionally includes a mechanical scanner 140 which can be similar in principle and operation to scanner 62 described above. Specifically, scanner 140 rotates the incoming light beam with respect to beam splitter 104. In some embodiments, scanner 140 is not employed and the scanning is effected by other means, such as, but not limited to, stage 126 described below.

System 100 can further comprise a data processor 114 configured to calculate a spectral image based, at least in part, on OPD data received from interferometer 102, or, more specifically, but not exclusively from array 120. The calculation of spectral image can be according to any technique known in the art, such as, but not limited to, the technique described in U.S. Pat. No. 5,539,517, the contents of which are hereby incorporated by reference. Data processor 114 can be a general purpose computer or dedicated circuitry.

Computer programs implementing procedures described herein and executable by data processor 114 (e.g., a procedure for calculating a spectral image) can be embodied on a tangible computer readable medium, comprising computer readable instructions for carrying out the procedures.

In some embodiments of the present invention system 100 comprises an orientation adjustor 116 configured to vary the relative orientation between at least two of beam splitter 104, reflector 132 and reflector 134. For example, adjustor 116 can vary a tilt angle $\psi$ of beam splitter 104 within interferometer 102, thereby to control the value of dOPD/dθ. Adjustor 116 can be in the form of an adjusting screw, a lever or the like.

Adjustor 116 is optionally and preferably configured to perform the variation without powering off system 100, e.g., during acquisition of spectral images by system 100. In various exemplary embodiments of the invention adjustor 116 is configured to perform the variation without disassembling system 100 and/or without disconnecting system 100 from the power source.

In various exemplary embodiments of the invention the absolute value of angle ψ is from about 0° (full alignment) to about 10°. In some embodiments of the present invention the angle ψ is at least 1° or at least 2° or at least 3° or at least 4° or at least 5°, or at least 6°, or at least 7°, or at least 8°, or at least 9°. In some embodiments, ψ is selected such that a zero OPD is off the center of the field-of-view (e.g., close to the side of the field-of-view), and the measurement is optionally and preferably performed on a non-symmetric interferogram.

Adjustor 116 is optionally and preferably configured to vary angle ψ over any of the above ranges, or any sub-range of the above ranges. Adjustor 116 can be a manually operated adjustor, or it can be controlled by a controller 118 configured for automatically operating adjustor 116. In some embodiments of the present invention data processor 114 is configured to execute a procedure for automatically calculating ψ.

Data processor 114 can display the result of the calculation to allow the user to manually align beam splitter 104 (for example, using adjustor 116). Data processor 114 can alternatively or additionally signal controller 118 to control adjustor 116 according to the calculated value of ψ. In some embodiments of the present invention data processor 114 is configured to receive data pertaining to an interference pattern model, and to signal controller 118 to operate adjustor 116 responsively to the data. In some embodiments, data processor 114 can calculates the interference pattern data.

Figure 3:
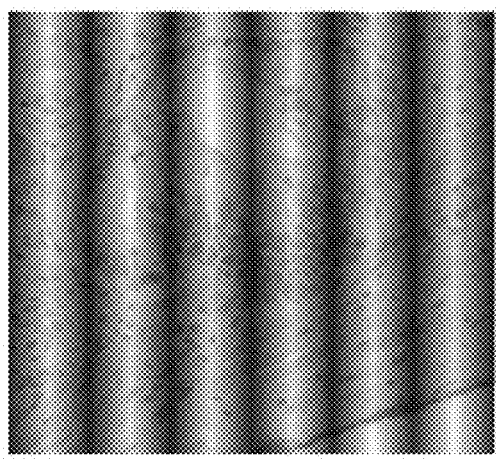
FIG. 3 is an image showing an interference pattern according to some embodiments of the present invention.

Interference pattern data relate to a phenomenon in which the OPD varies along a line of pixels over detector array 120, since, each pixel along the line is illuminated by rays that have a different entrance angle θ because they originate from a different point in the scene. To illustrate this phenomenon, consider a simplified case of a monochromatic image having a single wavelength λ. In this case, the intensity along a line of pixels change from the maximal intensity when the OPD equals m·λ to zero when the OPD equals λ/2+n·λ. As a result, the acquired image appears as an interference pattern in the form of an array of interference fringes, as exemplified in FIG. 3. It is recognized that for a polychromatic image the observed interference pattern deviates from a pure cosine-like function as shown in FIG. 3.

In some embodiments of the present invention, the interference pattern data comprise an interference parameter defined as the density of the interference fringes within a period of the interference pattern that corresponds to a given wavelength. The fringe density is optionally and preferably optimized for a given spectral characteristics and a smallest number of images that have to be measured. The density of the interference fringes can be realized as the number of pixels with the period of the interference pattern.

In some embodiments of the present invention the interference pattern data is used for calculating ψ. For example, a lookup table listing ψ values and corresponding fringe density values and wavelengths can be used for calculating ψ. Such a table can be stored in a computer readable medium accessible by processor 114.

The angle ψ and/or interference pattern data can be calculated based on one or more parameters. In some embodiments of the present invention an input spatial resolution parameter Δλ is received, and the angle ψ and/or interference pattern data is calculated based on Δλ. For example, from the value of Δλ, the value of $OPD_{max}$ can be obtained for a given λ (see EQ. 2), and the angle ψ and/or interference pattern data can be determined so as to ensure that the maximal OPD is the obtained $OPD_{max}$. To this end, a lookup table listing ψ values and/or interference pattern data and corresponding $OPD_{max}$ can be employed. Such a table can be stored in a computer readable medium accessible by processor 114. Also contemplated, are embodiments in which the calculation of the interference pattern data is executed analytically based on Δλ. Representative examples of such calculations are provided in the Examples section that follows.

In some embodiments of the present invention an input acquisition time parameter T is received and the angle ψ and/or interference pattern data can be calculated based on T. To this end, a lookup table listing ψ values and/or interference pattern data and corresponding T values can be employed. Such a table can be stored in a computer readable medium accessible by processor 114.

In some embodiments of the present invention a spatial location at which the OPD is zero, is received and the angle ψ and/or interference pattern data can be calculated based on that location. The location typically corresponds to a location within the field-of-view of the spectral imaging system, and is optionally and preferably expressed in the coordinate system of detector array. Typically, but not necessarily, the spatial location at which OPD=0 is off-center with respect to the field-of-view or the detector array. To this end, a lookup table listing ψ values and/or interference pattern data and corresponding spatial locations at which OPD=0, can be employed. Such a table can be stored in a computer readable medium accessible by processor 114.

In some embodiments of the present invention the angle ψ and/or interference pattern data is selected such that when using a generally monochromatic wavelength λ, the interference period is p, where λ and p are two predetermined parameters, which in some exemplary embodiments of the invention are selected independently, and in some exemplary embodiments of the invention are selected not-independently. The λ parameter can be in the range of 300-20,000 nanometers, and the p parameter can be in a range of pixels from 2 to 1000 pixels.

System 100 can further comprises a scanning stage 126 configured for establishing a relative motion between interferometer 102 and scene 130. Stage 126 can replace the scanning performed by scanner 140. The relative motion can be continuous or in steps, as desired. The relative motion can be a relative rotary motion, e.g., rotation of beam splitter 104 together with reflectors 132 and 134, and/or a relative translational motion, e.g., the translational motion of scene 130 relative to system 100. Also contemplated are embodiments in which a combination of rotary motion and translational motion is employed.

Following is a description of preferred imaging and processing procedures according to some embodiments of the present invention.

Figure 4A:
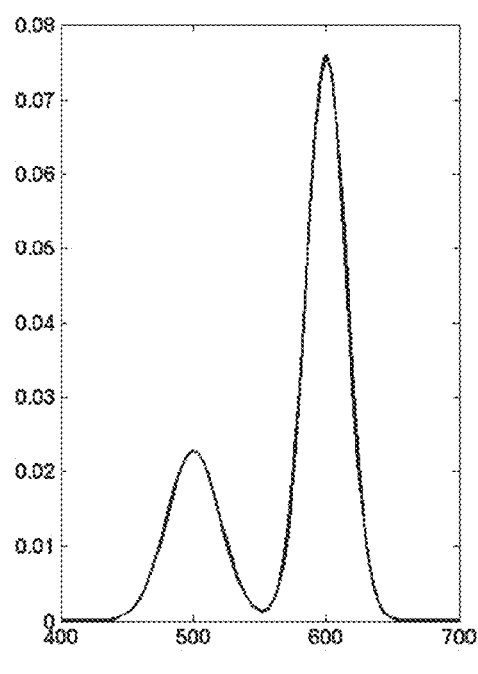
FIGS. 4A-B are graphs showing an interferogram (FIG. 4A) and its derived spectrum (FIG. 4B), as extracted by Fourier transformation according to some embodiments of the present invention.
Figure 4B:
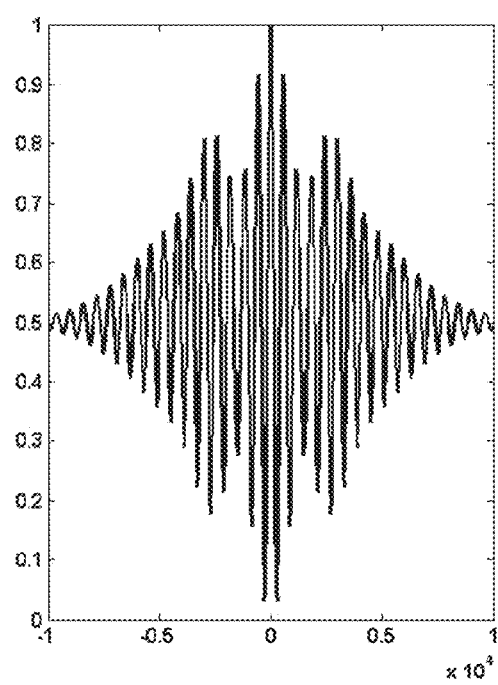

In order to calculate the spectrum a sufficient number of intensities I each measured at a different OPD is preferably collected. The function I(OPD) contains the information that is required for calculating the spectrum. This is optionally and preferably done by Fourier transforming the spectrum, for example, according to the following equation:

$$I(\sigma) = \sum_{i=1}^{N} I(OPD_i)\exp(-j2\pi\sigma OPD_i) \quad \text{(EQ. 4)}$$

Where $\sigma=1/\lambda$ is the wavenumber, j is the imaginary unit number, i is the index of the OPD and N is the total number of OPDs for which the intensity is measured. Optionally, one or more pre- and/or post-processing operations can be employed. Representative examples including, without limitation, phase correction, apodization and zero filling. Further details can be found in R. J. Bell, "Introductory Fourier transform spectroscopy" 1972, London: Academic Press. An example of a measured interferogram and its derived spectrum, as extracted by Fourier transformation, is shown in FIGS. 4A-B.

The intensities as a function of the OPD can be obtained by scanning.

In some embodiments an OPD-scan process is employed. In these embodiments, the interferometer is rotated while all the other optical elements are fixed. For example, reflectors 132 and 134 and beam splitter 124 can be rotated, leaving the other components static. The measurement is preferably executed such that for each small rotation, a single image is captured, until a sufficient number of images is captured. The rotation results in a change in the angle for each beam and the pattern travels along the horizontal axis. On the other hand, the image itself does not move, so that all the intensities that are measured can be collected for each pixel the interferogram can be built. The interferograms extracted at each pixel are optionally and preferably Fourier transformed and the collection of spectra of all pixels constructs the spectral image. A subset of images within the sequence of the OPD-scan method is shown in FIG. 5A.

In some embodiments of the present invention sample-scan process is employed. In these embodiments, the interferogram is kept fixed, and the sample is scanned, optionally and preferably in a direction orthogonal to the orientation of the interference lines (fringes). In such a process, the image can be shifted, but the interference pattern is fixed. In this process, the interferogram for each pixel can be constructed based on the pixel-shift from one image to another, wherein the intensities of the detector's pixels are collected. Thus, for each of a plurality of points of the sample, the intensities at different OPDs are collected. This can be followed by Fourier transformation and construction of the spectral image. A subset of images within the sequence of the sample-scan method is shown in FIG. 5A.

It is recognized by the present inventors that although these two processes provide for each point of the sample an interferogram to be transformed to its spectrum, these two processes differ from each other. The OPD, as stated, changes with the angle θ. This change is to a good approximation linear and can be written as OPD=Cθ. The horizontal end-pixels, for which the angle is maximal thus experience the largest OPD, and the spectral resolution $\Delta\lambda$ obtainable by the sample-scan process is at least $\lambda^2/(C\theta_{max})$. In the OPD-scan process, that maximal obtainable angle is larger than that achieved by the image-scan process, and depends more on the optical geometry of the interferometer itself. The actual value of $\theta_{max}$ depends on the maximal angle that the interferometer rotate before a vignetting is reached.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Figure 7:
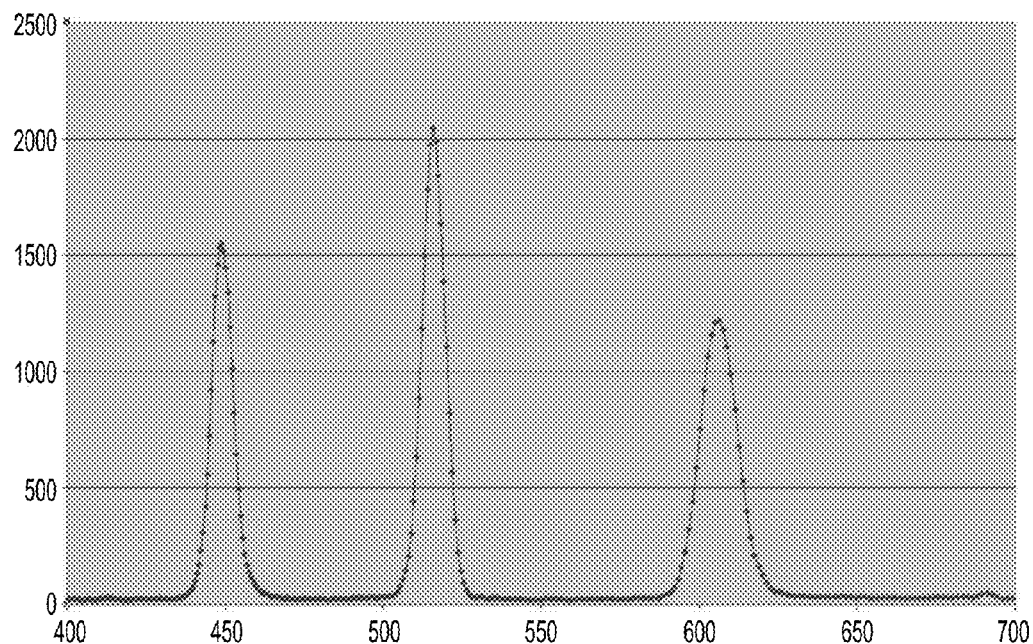
FIG. 7 is a graph demonstrating relatively high spectral resolution, obtained according to some embodiments of the present invention.
Figure 8:
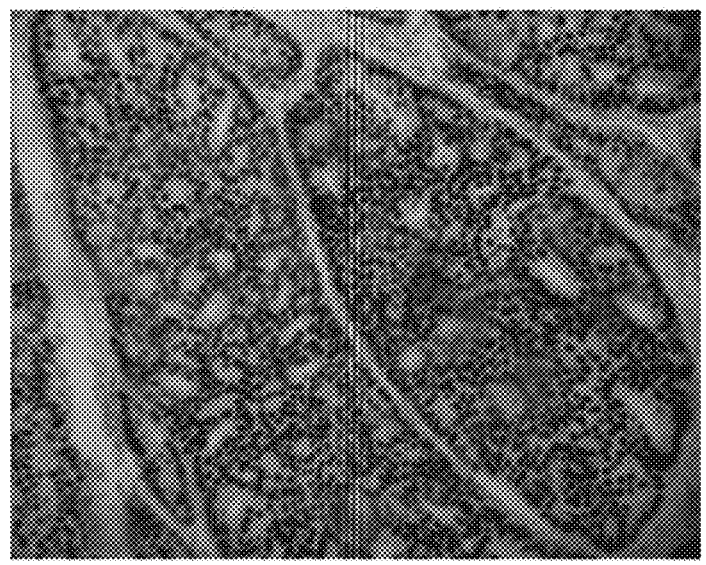
FIG. 8 is an image demonstrating a system that is calibrated according to some embodiments of the present invention for measuring high spectral resolution.

FIG. 6 is an image demonstrating high spectral resolution, obtained according to some embodiments of the present invention;

FIG. 7 is a graph demonstrating relatively high spectral resolution obtained according to some embodiments of the present invention;

FIG. 8 is an image demonstrating a system that is calibrated for measuring high spectral resolution, while it is evident from the small number of interference lines in the interferogram that the spectrum is very broad and does not contain high spectral resolution features.

Figure 9:
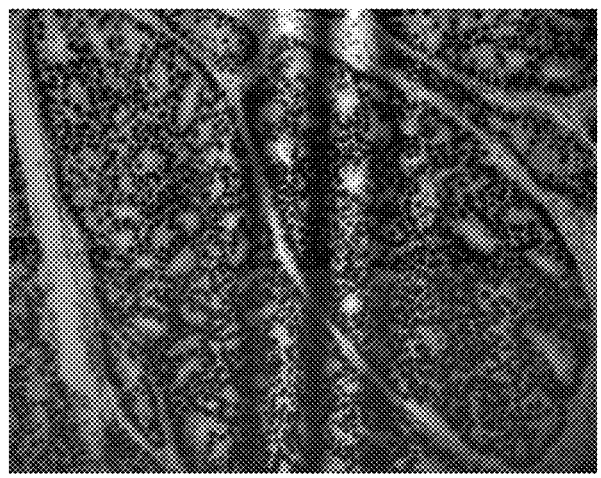
FIG. 9 is an image demonstrating a system that is calibrated obtained according to some embodiments of the present invention to have a relatively low spectral resolution.

FIG. 9 is an image demonstrating a system that is calibrated to have a relatively low spectral resolution that in this case is optimal for the actual features that exist in the image.

Example 2

In this example, a system that provides spectral resolution of 5 nm at a wavelength of 500 nm according to some embodiments of the present invention is described. The preferred threshold for the number of images that can provide such a resolution is analyzed.

The following parameters are used:

N=number of pixels along one axis of the array detector. In this example, an N×N array is considered.

S="fringe density." In this example the fringe density is realized as the number of pixels of one period of the interference pattern on the CCD at a wavelength of interest, say 500 nm. This can be changed according to some embodiments of the present invention by judicious selection of the tilt angle $\psi$.

n=the number of points in the interferogram that achieves the required resolution $\Delta\lambda$=the required resolution at a wavelength $\lambda$, which is the shortest wavelength that has to be measured. In this example, lower wavelengths are blocked optically. Note that the spectral resolution of a Fourier-based system is not constant with wavelength, and $\Delta\lambda_1/\Delta\lambda_2 = \lambda_1^2/\lambda_2^2$ (see EQ. 2). The number of periods of the interference pattern along the detector array is equal to N/S. Therefore, assuming that the system is aligned for a symmetric interferogram so that OPD=0 is at the center of the detector array, then $OPD_{max} = N\lambda/(2S)$. Substituting this into EQ. 2, one have:

$$\Delta\lambda = \frac{\lambda^2}{OPD_{max}} = \frac{2S}{N} \cdot \lambda, \text{ and } S = \frac{N}{2} \cdot \frac{\Delta\lambda}{\lambda}.$$

According to the Nyquist criterion, at least 2 points are measured in each interference period. Therefore, the minimal number of points that are measured equals to twice the number of periods:

$$n = \frac{2N}{S} = \frac{4\Delta\lambda}{\lambda}.$$

For example, 200 points can achieve a resolution of 10 nm at a wavelength of 500 nm.

Now assume, for example, that a certain measurement require a lower resolution of only 40 nm at a wavelength of 500 nm. This means that the "fringe density" can be changed to be 4 times wider, and the number of points can be reduced to 50.

This example demonstrates the advantage of setting the fringe density to its optimal value, and the ability of the present embodiments to set the fringe density without having to introduce new hardware to the system.

Example 3

In this example the acquisition time for scanning a large sample is calculated, and the efficiency of the technique of the present embodiments is demonstrated. In this example a microscopic slide with a tissue sample is considered.

In addition to the parameters N and S introduced in Example 2, the following parameters are used in this Example:

d=the size of the pixel along one dimension. In this example, a d×d square pixel is considered.

D=the size of the sample along one dimension. In this example, a D×D square sample is considered.

M=the magnification used for the measurement. This is determined according to the pixel-size and the spatial resolution that can provide the desired information from the sample.

The total length of the detector array along one dimension equals d·N. The scanning direction is the dimension along which the interferograms information is collected, and is referred to as the horizontal direction. The horizontal direction is perpendicular to the fringes as they appear in the image. The number of image that are collected along the horizontal direction equals to D/(N·d/M)=M·D/N·d. While each image is scanned, it is sufficient to acquire 2S/N images in order to collect 2 points within each interference period. Therefore, the total number of images that can be acquired along the scanning direction equals 2·M·D/S·d.

Along the other axis, the number of images can be the same as the calculated, but it is not necessary to scan for points in the interferogram. Thus, a spectral image f the entire sample can be provided by collecting $2(M \cdot D)^2/(S \cdot N \cdot d^2)$. Since the fringe density S is in the denominator, increasing S reduces the number of images.

As a numerical example, consider a system that is aligned to provide resolution of about 10 nm at a wavelength of 500 nm. Such configuration corresponds to S=200. For a detector array with 1000 pixels of 10 μm×10 μm, about 20,000 images are required to image a sample area of 10×10 mm². By selecting the appropriate angle $\psi$, S can be increased, for example, by 4. This reduces the spectral resolution to 40 nm at 500 nm, and thus reduces the total number of images to 5,000. Such a reduction can be advantageous for many applications, such as, but not limited to, pathology, in which many samples have to be scanned together.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of calibrating a spectral imaging system, the spectral imaging system comprising an interferometer having a beam splitter and a pair of reflectors directly receiving light rays split by said beam splitter, the method comprising:
    obtaining data pertaining to an interference pattern model;
    operating a pixilated detector array of the spectral imaging system to receive an input light beam and to provide an interference pattern of said light beam in a form of an array of interference fringes;
    determining a level of matching between said array of interference fringes and said interference pattern model by comparing spatial locations of interference fringes, and calculating percentage of fringes of said array of interference fringes and said interference pattern model that are at the same location within a predetermined distance tolerance; and
    varying a relative orientation between said beam splitter and each of said reflectors to effect a change in said interference pattern of said light beam, at least until said level of matching is 80%.

2. The method according to claim 1, wherein said interference pattern is a linear pattern and said data comprises a parameter that describes a density of interference lines in said linear pattern.

3. The method according to claim 1, further comprising, filtering said input light beam to provide a generally monochromatic light beam.

4. The method according to claim 1, wherein said obtaining said data comprises calculating said data.

5. The method of claim 1, further comprising receiving an input spectra resolution parameter and calculating said data responsively to said input spectra resolution parameter.

6. The method according to claim 1, further comprising receiving an input spatial resolution parameter and calculating said data responsively to said input spatial resolution parameter.

7. The method according to claim 1, further comprising receiving an input acquisition time parameter and calculating said data responsively to said input acquisition time parameter.

8. The method according to claim 4, wherein said calculation comprises receiving a spatial location at which an optical path difference between secondary light beams split by said beam splitter is zero, and calculating said data responsively to said location.

9. The method according to claim 1, further comprising receiving a spatial location at which an optical path difference between secondary light beams split by said beam splitter is zero, and calculating said data responsively to said location.

10. The method according to claim 8, wherein said location is an off-center relative to a field-of-view characterizing said light beam.

11. The method according to claim 1, wherein said variation of said relative orientation is executed automatically by a controller associated with a data processor.

12. The method according to claim 1, wherein said operating the spectral imaging system comprises scanning said light beam.

13. The method according to claim 12, wherein said scanning is effected by a relative rotary motion between said input light beam and said beam splitter while a relative orientation said beam splitter and said reflectors is fixed.

14. The method according to claim 1, wherein said scanning is effected by a relative translational motion between said input light beam and said beam splitter while a relative orientation said beam splitter and said reflectors is fixed.

15. The method according to claim 1, further comprising fixing said relative orientation once said interference pattern of said input light beam substantially matches said interference pattern model, and operating said spectral imaging system at said fixed relative orientation to provide a spectral image of a scene.

16. A spectral imaging system, comprising:
    an interferometer having a beam splitter and a pair of reflectors, said beam splitter being configured to split an input light beam into secondary light beams propagating directly to said reflectors;
    a pixilated detector array for receiving said secondary light beams, after said secondary light beams have experienced an optical path difference, and providing an interference pattern of said light beam in a form of an array of interference fringes;
    an orientation adjustor configured to vary a relative orientation between said beam splitter and each of said reflectors, during acquisition of spectral images by the spectral imaging system;
    a controller configured for automatically operating said orientation adjustor; and
    a data processor configured to receive data pertaining to an interference pattern model, to determine a level of matching between said array of interference fringes and said interference pattern model by comparing spatial locations of interference fringes, and to calculate percentage of fringes of said array of interference fringes and said interference pattern model that are at the same location within a predetermined distance tolerance, and to signal said controller to operate said orientation adjustor at least until said level of matching is 80%.

17. The system according to claim 16, wherein said data processor is configured to calculate said data.

18. The system according to claim 17, wherein said data processor is configured to receive an input spectra resolution parameter and to calculate said data responsively to said input spectra resolution parameter.

19. The system according to claim 17, wherein said data processor is configured to receive an input spatial resolution parameter and to calculate said data responsively to said input spatial resolution parameter.

20. The system according to claim 17, wherein said data processor is configured to receive an input acquisition time parameter and to calculate said data responsively to said input acquisition time parameter.

21. The system according to claim 17, wherein said data processor is configured to receive a spatial location at which an optical path difference between secondary light beams split by said beam splitter is zero, and to calculate said data responsively to said location.

* * * * *